United States Patent
Wei

[15] 3,694,450
[45] Sept. 26, 1972

[54] 2-SUBSTITUTED-4,5,6,7-TETRAHYDROBENZOTHIAZOLE-4-CARBOXYLIC ACIDS AND THEIR ALKYL ESTERS

[72] Inventor: Peter H. L. Wei, Springfield, Pa.

[73] Assignee: American Home Products Corporation, New York, N.Y.

[22] Filed: March 17, 1971

[21] Appl. No.: 125,413

[52] U.S. Cl......260/294.8 C, 260/240 G, 260/302 F, 260/306.7, 260/306.8 R, 424/266, 424/270
[51] Int. Cl............................................C07d 31/50
[58] Field of Search.............................260/294.8 C

[56] References Cited

OTHER PUBLICATIONS

Elderfield, Heterocyclic Compounds, Vol. 5, Wiley Publishers, Pages 496–499 (1957)

*Primary Examiner*—Alan L. Rotman
*Attorney*—Andrew Kafko, Joseph Martin Weigman, Dwight J. Potter, Vito Victor Bellino and Robert Wiser

[57] ABSTRACT

Novel pharmacologically active compounds have been prepared which have the general formulas:

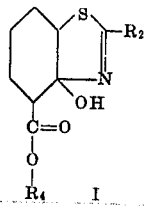 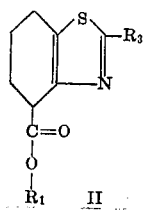

wherein $R_1$ is selected from the group consisting of hydrogen and (lower)alkyl; $R_2$ is selected from the group consisting of phenyl, halophenyl and (lower)alkylphenyl; alkylphenyl; $R_3$ is selected from the group consisting of phenyl, halophenyl, (lower)alkylphenyl, pyridyl, amino, anilino, hydrazino, benzylidenehydrazino, halobenzylidenehydrazino, nitrobenzylidenehydrazino and (lower) alkylbenzylidenehydrazino; $R_4$ is (lower)alkyl; and the pharmaceutically acceptable salts thereof.

3 Claims, No Drawings

2-SUBSTITUTED-4,5,6,7-TETRAHYDROBENZOTHIAZOLE-4-CARBOXYLIC ACIDS AND THEIR ALKYL ESTERS

DESCRIPTION OF THE INVENTION

This invention is concerned with novel chemical compounds that are pharmacologically active as central nervous system depressants. The compounds are of the general formulas:

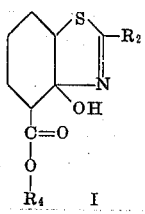 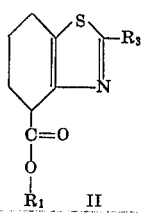

wherein $R_1$ is selected from the group consisting of hydrogen and (lower)alkyl; $R_2$ is selected from the group consisting of phenyl, halophenyl and (lower)alkylphenyl; $R_3$ is selected from the group consisting of phenyl, halophenyl, (lower)alkylphenyl, amino, pyridyl, anilino, hydrozino, benzylidenehydrazino, halobenzylidene-hydrazino, nitrobenzylidenehydrazino and (lower)alkylbenzylidene-hydrazino; $R_4$ is (lower)alkyl; and the pharmaceutically acceptable salts thereof.

Compounds of Formula I when $R_1$ is (lower)alkyl may be prepared by the following reaction scheme:

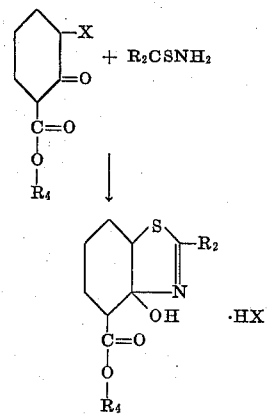

wherein $R_2$ is the same as hereinabove defined; X is halogen, and $R_4$ is (lower)alkyl.

The reactants are admixed in the presence of an organic solvent such as benzene, chloroform, and heated at a temperature of from about 80° to 100° C. for a period of 24 to 48 hours in the presence of an acid scavenger such as triethylamine, pyridine or quinoline. The inorganic solid material is filtered off and the filtrate is washed with water and dried over anhydrous magnesium sulfate. After removal of the solvent, the oily residue is dissolved in hot petroleum ether. The petroleum ether is removed and the oil is dissolved in ether and ether solution is acidified with alcoholic HCl. The ether solution is decanted, and the residue is treated with a solvent such as dimethoxyethane, and the solid is collected. The crude solid may be purified by recrystallization from an appropriate solvent.

Compounds of formula II when $R_3$ is amino, anilino, phenyl, (lower)alkyphenyl and halophenyl may be prepared by a procedure completely analogous to that employed for the preparation of compounds of Formula I. For those compounds of Formula II wherein $R_3$ is hydrazino, benzylidenehydrazino, halobenzylidenehydrazino, nitrobenzylidenehydrazino and (lower) alkylbenzylidenehydrazino the following procedure may be employed:

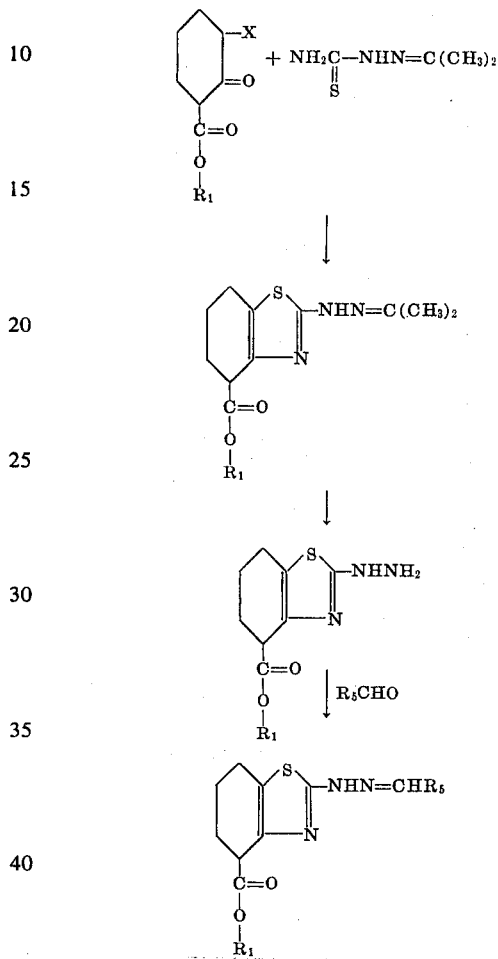

wherein X is the same as hereinabove described and $R_5$ is selected from the group consisting of phenyl, halophenyl, nitrophenyl and (lower)alkylphenyl.

The above described process involves heating the reactants in a solvent, such as benzene, chloroform, xylene, totuene etc. at a temperature of from about 80° to 100° for a period of from about 24 to about 72 hours in the presence of an acid scavenger such as triethylamine, pyridine, quinoline and the like. After removal of the inorganic material and the solvent, the residue is extracted with petroleum ether, is acidified, followed by treatment with an aldehyde. The crude material may be recrystallized from a suitable solvent such as ethanol.

When compounds of Formula II are prepared wherein $R_3$ is pyridyl, the following procedure is preferably employed:

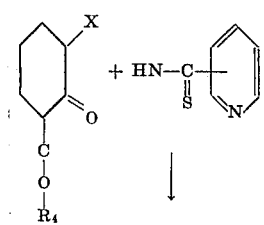

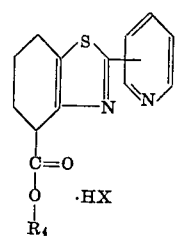

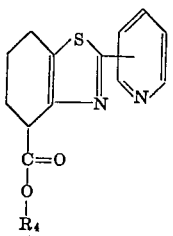

wherein X and R₄ are the same as hereinabove defined. The process comprises refluxing the reactants in glacial acetic acid for a period of about 15 to about 20 hours. After removal of solvent the residue is treated with an organic solvent such as ether or dimethoxyethane and then is purified by recrystallization from a suitable solvent such as acetone or dioxane. The ester may be obtained by hydrolysis according to the procedure set forth hereinafter.

The compounds of Formula II wherein $R_1$ is hydrogen may be prepared according to the following hydrolytic method:

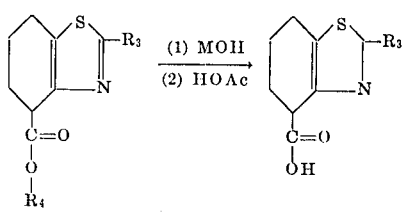

wherein R₄ is (lower)alkyl and M is an alkali metal.

The process involves heating the appropriate alkyl ester in an aqueous solution of an alkali metal hydroxide until the solution is complete. The alkaline solution is neutralized with a weak acid, such as acetic acid, to precipitate the product. The crude material may be purified by crystallization from an appropriate solvent.

In the evaluation of the biological activity of the compounds of the invention, the in vivo effects were tested as follows: The compound was administered orally or intraperitoneally to three mice (14 to 24 grams) at each of the following doses. 400, 127, 40 and 12.7 milligrams per kilogram of host body weight (MPK). The animals were watched for a minimum of two hours during which signs of general stimulation, (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) were noted.

The compounds of the invention induce central nervous system depressant effects at a dose of 12.7 to 400 MPK. Thus the compounds of the invention have demonstrated utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a sedative or calming effect in mammals.

When the compounds of the invention are employed as described above, they may be administered alone or in combination with pharamcologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, calcium carbonate and the like. They may be administered orally in the form of solutions which may contain coloring and flavoring agents or they may be administered by parenteral injection, e.g., intramuscular injection. The injectable solution may contain other solutes such as sodium chloride or glucose in a sufficient quantity to render the solution isotonic.

The dosage of the pharmacological agents of the invention will vary with the route of administration and the particular compound chosen.

The term (lower) alkyl is used to include both straight and branched chain hydrocarbon groups containing from one to about six carbonations such as methyl, ethyl, i-propyl, n-butyl, n-hexyl and the like. The terms halo and halogen are used to identify chlorine, bromine and iodine. The term pharmaceutically acceptable acid addition salts is used to include those non-toxic acid addition salts which are formed by the reaction with acids such as hydrochloric, hydrobromic, sulfuric, phosphoric, nitric and the like.

The following examples are included to illustrate but not to limit the scope of the invention:

EXAMPLE 1

3a, 4,5,6,7,7a-Hexahydro-3a-hydroxy-2-phenyl-benzothiazole-4-carboxylic acid, ethyl ester, hydrochloride 6-Bromo-2-carbethoxycyclohexanone (43.0 g, 0.173 m) [described by J. E. Brenner, J. Org. Chem. 26, 22–27 (1961)] and thiobenzamide (26.0 g, 0.19 m) were heated to reflux in benzene for 24 hours in the presence of triethylamine (34.4 g, 0.344 m). The solid was filtered and the filtrate, after washing with water and drying, was concentrated. The oily residue was extracted with hot petroleum ether. A 16 g portion (58 percent) of the thiobenzamide was recovered unchanged. The oil, after removal of petroleum ether, was dissolved in ether, and the ether solution was acidified with alcoholic hydrogenchloride. The ether was decanted, and the heavy oil was treated with dimethoxyethane, and the solid weighing 21.0 g (36 percent) was collected. The crude material was dissolved in hot chloroform and filtered from insoluble impurities. Evaporation of the solvent gave an oily residue, which crystallized from a small amount of dimethoxyethane. The solid was collected. The pure compound has a melting point of 122° –3° C.

Anal. Calcd for $C_{16}H_{19}NO_3S \cdot HCl$: C, 56.20; H, 5.90; Cl, 10.37; N, 4.10; S, 9.38.

Found: C, 56.22; H, 5.91; Cl, 10.25; N, 3.96; S, 9.48.
IR (KBr): OH, 3.3 $\mu$; amine HBr, 4.0 $\mu$; ester, 5.8 $\mu$.
NMR (CDCl₃): aromatic, 7.7 δ; ethoxy, 4.3 δ (q) and 1.3 δ (t); other aliphatic 3.6 δ and 1.8 δ.

EXAMPLE 2

2-Anilino-4,5,6,7-tetrahydro-4-benzothiazolecarboxylic acid, ethyl ester, hydrochloride 6-Bromo-2-carbethoxycyclohexanone (9.96 g, 0.04 m), phenylthiourea (6.68 g, 0.044 m) and triethylamine (8.0 g, 0.08 m) were heated to reflux in benzene for 40 hours. During this time the water that formed from the reaction was azeotropically distilled. After filtration of the solid the solution was concentrated. The residual oil was dissolved in ether, and the ether solution was acidified with an alcoholic HCl. The ether solution was decanted and the oily material was treated with dimethoxyethane. A white solid material was collected which weighed 10.0 g (66 percent yield). An analytical sample melting at 136°–8° C was prepared by recrystallization of the above sample from dimethoxyethane.

Anal. Calcd for $C_{16}H_{20}N_2O_2S \cdot HCl$: C, 56.70; H, 5.65; Cl, 10.46; N, 8.27.

Found: C, 56.28; H, 5.54; Cl, 10.48; N, 8.33.

IR: amine HCl, 3.7 $\mu$; ester 5.75 $\mu$; NH, 6.15 $\mu$. NMR ($CDCl_3$): aromatic, 7.3 $\delta$ (s); ethoxy, 4.3 $\delta$ (q), 1.4 $\delta$ (t); other aliphatic, 3.8 $\delta$, 2.6 $\delta$ and 2.0 $\delta$ with complex pattern; also exchangeable proton upper field.

EXAMPLE 3

2-Anilino-4,5,6,7-tetrahydro-4-benzothiazolecarboxylic acid

The HCl salt of the ethyl ester of 2-anilino-4,5,6,7-tetrahydro-4-benzothiazolecarboxylic acid (7.2 g) was suspended in an aqueous solution of three equivalents of sodium hydroxide and the suspension was heated on a steam bath for 24 hours. The solution was cooled and neutralized with acetic acid. The solid was collected and weighed 4.5 g. The crude material was recrystallized from a mixture of dioxane and dimethoxyethane. The pure compound melted at 187°–9° C.

Anal. Calcd for $C_{14}H_{14}N_2O_2S$: C, 61.30; H, 5.14; N, 10.21.

Found: C, 61.14; H, 4.90; N, 9.94.

IR: carboxyl, 4.2 $\mu$; Zwiterionic carboxyl, 6.1 $\mu$. NMR (DMSO): complex aromatic, 7.2 $\delta$, aliphatic, 3.5 $\delta$, 2.5$\delta$ and 1.9$\delta$.

EXAMPLE 4

4,5,6,7-Tetrahydro-2-phenyl-4-benzothiazolecarboxylic acid, ethyl ester, hydrochloride The hydrochloride of the ethyl ester of 3a, 4,5,6,7a-hexahydro-3a-hydroxy-2-phenylbenzothiazole-4-carboxylic acid, (4.7 g) was heated in chloroform. After filtration of the insoluble material, the filtrate was evaporated. The oily residue was dissolved in a small amount of dimethoxyethane. The solid weighing 3.6 g was collected and melted at 120°–3° C.

Anal. Calcd for $C_{16}H_{17}NO_2S \cdot HCl$: C, 59.34; H, 5.60; Cl, 10.95; N, 4.33; S, 9.90.

Found: C, 59.51; H, 5.28; Cl, 10.63; N, 4.26; S, 10.07.

IR: amine HCl, 4.2 $\mu$; ester, 5.8 $\mu$. NMR ($CDCl_3$): aromatic, 7.8 $\delta$, ethoxy 4.25 $\delta$ (q), 1.3 $\delta$ (t); other complex aliphatic, 2.9 $\delta$ and 2.0 $\delta$.

EXAMPLE 5

4,5,6,7-Tetrahydro-2-phenyl-4-benzothiazolecarboxylic acid

The ethyl ester of 4,5,6,7-tetrahydro-2-phenyl-4-benzothiazolecarboxylic acid prepared by neutralizing the corresponding HCl salt, was added to a 4N NaOH solution, and the suspension was heated on a steam bath for 48 hours. The solution was cooled and then extracted with benzene. The aqueous solution was neutralized with acetic acid. The solid was collected and dried. The crude material was recrystallized from benzene. The pure acid weighed 4.0 g and melted at 152°–4 C.

Anal. Calcd for $C_{14}H_{13}NO_3S$: C, 64.85; H, 5.05; N, 5.40.

Found: C, 65.06; H, 4.96; N, 5.34.

IR: OH of carboxyl, 4.0 $\mu$; carboxyl, 5.75 $\mu$. NMR ($CDCl_3$): complex aliphatic patterns at 2.1 $\delta$, 2.8 $\delta$ and 3.8 $\delta$; aromatic, 7.5 (m), also exchangeable proton upfield.

EXAMPLE 6 a. 2-Amino-4,5,6,7-tetrahydro-4-benzothiazolecarboxylic acid, ethyl ester, hydrochloride 6-Bromo-2-carbethoxycyclohexanone (30.0 g, 0.12 m), thiourea (9.0 g, 0.12 m), and triethylamine (24.0 g. 0.24 m) were heated to reflux in benzene overnight. After filtration of the inorganic material the solvent was evaporated. The residue, after washing with water, gave 11.0 g of solid material. The crude amino acid was dissolved in ether, and the ether solution was acidified with an alcoholic HCl solution. After the ether was decanted the solid was recrystallized from a mixture of alcohol and dimethoxyethane. The HCl salt melted at 189°–91bL C.

Anal. Calcd for $C_{10}H_{14}N_2O_2S \cdot HCl$: 45.69; H, 5.75; N, 10.66.

Found: C, 45.35; H, 5.55; N, 10.98.

IR: amine HCl 3.4 $\mu$; ester, 5.75 $\mu$, amine 6.1 $\mu$. NMR ($CDCl_3$): ethoxy, 1.25 $\delta$ (t), 4.2 $\delta$ (q); complex aliphatic, 2.0 $\beta$, 2.5 $\delta$ and 3.65 $\delta$; exchangeable, 5.3 $\delta$.

b. 2-Amino-4,5,6,7-tetrahydro-4-benzothiazolecarboxylic acid

The ethyl ester of 2-amino-4,5,6,7-tetrahydro-4-benzothiazolecarboxylic acid (12.0 g, 0.0526 m) was suspended in an aqueous solution containing 3.2 g of sodium hydroxide. The suspension was heated on a steam bath until the solution was complete. A small amount of solid material was filtered, and the filtrate was neutralized with acetic acid. The crude amino acid was recrystallized from aceto nitrile. Recrystallized compound weighed 6.0 g and had a melting point of 164°–6 C.

Anal. Calcd for $C_8H_{10}N_2O_2S$: C, 48.48; H, 5.09; N, 14.14.

Found: C, 48.41; H, 5.21; N, 14.37.

IR (KBr): amine and carboxyl, 4.0 $\mu$; Zwitterionic 6.1 $\mu$. NMR (DMSO-$d_6$): complex aliphatic, 1.9 $\delta$, 2.5 $\delta$ and 3.4 $\delta$; exchangeable upfield; no aromatic.

EXAMPLE 7

2-(p-Chlorophenyl)-3a,4,5,6,7,7a-hexahydro-3a-hydroxy-4-benzothiazolecarboxylic acid, ethyl ester, hydrochloride 6-Bromo-2-carbethoxycyclohexanone (15.7 g, 0.063 m), p-chlorothiobenzamide (10.8 g, 0.063 m) and triethylamine (12.6 g, 0.126 m) were heated to reflux in benzene for 3 days. After removal of the inorganic material, the benzene solution was washed with water and dried. After benzene was removed, the residue was dissolved in petroleum ether. After removal of petroleum ether, the residue (16 g) was dissolved in ether and the ether solution was acidified with an alcoholic HCl solution. The ether solution was decanted, and the residue was treated with dimethoxyethane to give a solid material. The crude material was dissolved in cold chloroform, and the solution was filtered and evaporated. The residue was crystallized in a small amount of dimethoxyethane. The pure compound weighed 6.9 g and had a melting point of 133°–4° C.

Anal. Calcd for $C_{16}H_{18}ClNO_3S \cdot HCl$: C, 51.07; H, 5.09; N, 3.72.

Found: C, 51.39; H, 5.02; N, 3.69.

IR (KBr): OH and amine HCl, 3.3 $\mu$; ester, 5.75 $\mu$. NMR (DMSO-$d_6$): aromatic, 7.8 $\delta$ (q); ethoxy, 4.2 $\delta$ (q), 1.25 $\delta$ (t); complex aliphatic, 3.3 $\delta$, 2.8 $\delta$ and 1.8 $\delta$.

EXAMPLE 8

4,5,6,7-Tetrahydro-2(p-nitrobenzylidenehydrazino)-4-benzo-thiazolecarboxylic acid, ethyl ester, hydrochloride A mixture of 6-bromo-2-carbethoxycyclohexane (10.0 g, 0.04 m), acetone semicarbazone (5.76 g, 0.04 m) and triethylamine (8.0 g, 0.08 m) was heated to reflux in benzene for three days. After the inorganic material was filtered off, the benzene solution was washed with water and dried over anhydrous magnesium sulfate. After removal of benzene, the residue was dissolved in petroleum ether. Removal of petroleum ether gave 10.0 g. of ethyl ester of 4,5,6,7-tetrahydro-2-(isopropylidenehydrazino)-4-benzothiazolecarboxylic acid.

The above isopropylidene compound was dissolved in alcohol, and the alcoholic solution was acidified with an alcohol HCl solution. The acid solution was heated on a steam bath for 1 hour. Alcohol was removed and the residue was dissolved in water. The aqueous solution, after washing with benzene, was neutralized with a sodium carbonate solution. The alkaline solution was extracted with benzene. Upon work-up the benzene solution yielded 4.3 g of the ethyl ester of 2-hydrazino-4,5,6,7-tetrahydro-4-benzothiazolecarboxylic acid.

An ether solution of the above hydrazino compound and p-nitrobenzaldehyde (3.1 g, 0.021 m) was acidified with an alcoholic HCl solution, and the acid solution was warmed gently on a steam bath. The solid which separated was collected and weighed 4.8 g. The crude material was recrystallized from alcohol. The pure p-nitrobenzylidenehydrazino compound melted at 240°–5(dec.).

Anal. Calcd for $C_{17}H_{18}N_4O_4S \cdot HCl$: C, 49.69; H, 4.66; N, 13.63.

Found: C, 49.48; H, 4.60; N, 13.45.

IR (KBr): amine HCl, 3.9 $\mu$; ester, 5.75 $\mu$; $NO_2$, 6.6 $\mu$ and 7.45 $\mu$. NMR (DMSO-$d_6$): aromatic, 8.15 $\delta$ (q); ethoxy, 4.2 $\delta$(q), 1.25 $\delta$ (t); complex aliphatic, 3.7 $\delta$ and 1.9 $\delta$.

EXAMPLE 9

4,5,6,7-Tetrahydro-2-(3-pyridyl)-4-benzothiazolecarboxylic acid, ethyl ester, hydrobromide 6-Bromo-2-carbethoxycyclohexanone (20.0 g, 0.08 m) and thionicotinamide (11.0 g, 0.08 m) were heated to reflux in 300 ml of acetic acid for 18 hours. After some impurities were filtered, the solvent was removed. The residue was washed with ether and dimethoxyethane. From the dimethoxyethane solution 7.5 g. of the hydrobromide salt was obtained. The dimethoxyethane-insoluble oil was triturated with acetone to give an additional 8.0 g of crude product. The combined crude materials were dissolved in acetone, and the acetone solution was treated with Darco. The acetone solution was concentrated to a small volume. The solid was collected and weighed 10.0 g. It had a melting point of 177°–9° C.

Anal.Calcd for $C_{15}H_{16}N_2O_2S \cdot HBr$: C, 48.77; H, 4.64; Br, 21.64; N, 7.59; S, 8.68.

Found: C, 48.55; H, 4.63; Br, 21.61; N, 7.52; S, 8.66.

IR (KBr): pyridine HBr, 4.1 $\mu$, 4.9 $\mu$ and 5.2 $\mu$; ester, 5.8 $\mu$. NMR (CDCl$_3$): aromatic, 8.5 $\delta$; ethoxy, 4.2 $\delta$ (q) 1.3 $\delta$ (t); complex aliphatic, 4.0 $\delta$, 3.0 $\delta$, 2.2 $\delta$.

EXAMPLE 10

4,5,6,7-Tetrahydro-2-(3-pyridyl)-4-benzothiazolecarboxylic acid

The HBr salt of the ethyl ester of 4,5,6,7-tetrahydro-2-(3-pyridyl)-4-benzothiazolecarboxylic acid (6.0 g., 0.0162 m) dissolved in water was treated with an aqueous solution of 1.6 g (0.0407 m) of sodium hydroxide. The mixture was stirred and warmed on a hot plate until solution was complete. After small amounts of impurities were removed, the filtrate was neutralized with acetic acid. The solid was collected, washed well with water, and dried at room temperature. The crude material was recrystallized from dioxane. The pure compound weighed 3.8 g and had a melting point of 220°–5 C.

Anal. Calcd for $C_{13}H_{12}N_2O_2S$: C, 59.98; H, 4.65; N, 10.76.

Found: C, 59.96; H, 4.55; N, 10.46.

IR(KBr): amine salt, 3.5 $\mu$, 4.2 $\mu$, pyridine salt, 5.2 $\mu$; carboxyl, 5.9 $\mu$. NMR (DMSO-$d_6$): aromatic, 8.0 $\delta$; complex aliphatic, 3.8 $\delta$, 2.9 $\delta$ and 2.0 $\delta$.

EXAMPLE 11

2-(p-Chlorophenyl)-4,5,6,7-tetrahydro-4-benzothiazolecarboxylic acid, ethyl ester, hydrobromide A glacial acetic acid solution of 6-bromo-2-carbethoxy-cyclohexanone (9.96 g, 0.04 m) and p-chlorothiobenzamide (6.48, 0.04 m) was heated on a steam bath for 15 hours. After filtration the filtrate was concentrated. The oily residue was triturated with absolute ether, and the crude solid material (8.6 g) was collected. Recrystallization in acetone afforded pure compound, mp 154°–6°.

Anal. Calcd for $C_{16}H_{16}ClNO_2S \cdot HBr$: C, 47.72; H, 4.26; Br, 19.85; Cl, 8.80; N, 3.48; S, 7.96.

Found: C, 47.58; H, 4.39; Br, 19.39; Cl, 8.60; N, 3.58; S, 7.67.

IR (KBr): amine HBr, 4.2 $\mu$; ester, 5.75 $\mu$; amine HBr, 6.2 $\mu$. NMR (CDCl$_3$): aromatic, 8.0 $\delta$(q); ethoxy, 4.25 $\delta$ (q) and 1.3 $\delta$ (t); aliphatic spread between 1.8 to 3.1 $\delta$ also exchangeable at 4.5 $\delta$.

EXAMPLE 12

2-(p-Chlorophenyl)-4,5,6,7-tetrahydro-4-benzothiazolecarboxylic acid,

An alkaline solution (made from 2.0 g of NaOH and water) of 2-(p-chlorophenyl)-4,5,6,7-tetrahydro-4- benzothiazole-carboxylic acid, ethyl ester, hydrobromide, (4.0 g) was heated at gentle reflux for five hours. After filtration the filtrate was neutralized with acetic acid. The crude material (3.6 g) was recrystallized from benzene. The carboxylic acid melted at 171°–3°.

Anal. Calcd for $C_{14}H_{12}ClNO_2S$: C, 57.23; H, 4.12; Cl, 12.07; N, 4.77; S, 10.91.

Found: C, 57.44; H, 4.35; Cl, 11.92; N, 4.55; S, 10.70.

IR (KBr): OH of carboxylic acid, 3.5 $\mu$; carbonyl of carboxylic acid, 5.85 $\mu$.

As used herein the term (lower)alkyl is meant to include straight and branched chain hydrocarbon radicals containing from one to about six carbon atoms such as methyl, ethyl, i-propyl, n-propyl, n-butyl and the like. The terms halo and halogen are used to described chloro, bromo, and iodo. The term pharamaceutically acceptable salts is used to denote those compounds which are prepared by reaction of the base form with acids such as hydrochloric, hydrobromic, hydroiodic, sulfuric, nitric, phosphoric, benzenesulfonic, toluenesulfonic, methyl-sulfonic and the like.

EXAMPLE 13

By analogous methods the following compounds may be prepared:

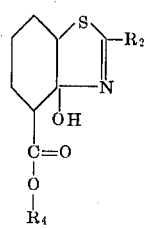

wherein $R_2$ and $R_4$ are as follows:

| $R_2$ | $R_4$ |
|---|---|
| p-bromophenyl | methyl |
| p-toluene | ethyl |
| m-ethylphenyl | ethyl |
| p-(n-isopropyl)phenyl | ethyl |
| p-iodophenyl | n-propyl |
| p-(n-butyl)phenyl | methyl |
| p-toluene | n-butyl |

EXAMPLE 14

By methods analogous to those employed above, the following compounds may be prepared:

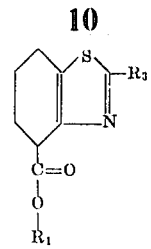

wherein $R_1$ and $R_3$ are as follows:

| $R_1$ | $R_3$ |
|---|---|
| ethyl | phenyl |
| i-propyl | p-tolyl |
| n-propyl | p-bromophenyl |
| methyl | p-iodophenyl |
| hydrogen | p-bromophenyl |
| hydrogen | m-tolyl |
| ethyl | p-ethylphenyl |
| methyl | m-(n-propyl)phenyl |
| n-butyl | 4-pyridyl |
| n-propyl | amino |
| hydrogen | hydrazino |
| ethyl | hydrazino |
| hydrogen | benzylidenehydrazino |
| methyl | benzylidenehydrazino |
| n-propyl | benzylidenehydrazino |
| hydrogen | p-chlorobenzylidenehydrazino |
| methyl | p-bromobenzylidenehydrazino |
| ethyl | p-iodobenzylidenehydrazion |
| hydrogen | p-nitrobenzylidenehydrazino |
| hydrogen | m-ethylbenzylidenehydrazino |
| n-propyl | p-methylbenzylidenehydrazino |

We claim:
1. A compound of the formula

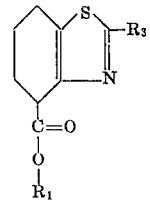

wherein $R_1$ is selected from the group consisting of hydrogen and (lower)alkyl; $R_3$ is pyridyl and the pharmaceutically acceptable salts thereof.

2. A compound as defined in claim 1 which is 4,5,6,7-tetrahydro-2-(3-pyridyl)-4-benzothiazolecarboxylic acid, ethyl ester, hydrobromide.

3. A compound as defined in claim 1 which is 4,5,6,7-tetrahydro-2-(3-pyridyl)-4-benzothiazolecarboxylic acid.

* * * * *